Patented Dec. 3, 1929

1,737,685

UNITED STATES PATENT OFFICE

WALTER H. RISING, OF PAINTED POST, NEW YORK, ASSIGNOR TO CORNING GLASS WORKS, OF CORNING, NEW YORK, A CORPORATION OF NEW YORK

HEAT-ABSORBING BOROSILICATE GLASS AND METHOD OF MAKING THE SAME

No Drawing.   Application filed May 24, 1928. Serial No. 280,388.

Since the alkalies, soda, potash, etc., have by far the greatest effect of any of the elements on the expansion coefficient of glasses, low expansion glasses are necessarily of low alkali content. Moreover since the alkalies serve as fluxes, it is customary to replace them in part by boric oxide which is also a flux but has a relatively low expansion factor. Therefore glasses of high expansion are known as alkaline or basic glasses and glasses of low expansion are known as acid glasses. As a rule the colors imparted by the various coloring agents to alkaline glasses are quite different from those they impart to acid glasses. In alkaline glasses the color produced by ferrous iron is generally blue-green, but as the alkali content is decreased and boric oxide increased the color changes through yellowish green, greenish amber and brown until in high acid glasses the color is black. Invariably the blue and blue-green glasses have a high heat-absorption, but as they lose their bluish color and become more yellow, the heat-absorption decreases and usually the visible transmission as well.

I have discovered that zinc or cadmium when added to acid glasses, have the peculiar property of maintaining the blue-green color due to ferrous iron with a consequent high efficiency in respect to heat-absorption and visible transmission. My researches indicate that these are the only elements of the second periodic group which has this property although the other elements may also be present in glasses made in accordance with this invention, providing they do not exceed the zinc or cadmium in amount. In fact the use of a small amount of lime with the zinc or cadmium produces better results than zinc or cadmium alone.

The following are examples of borosilicate glasses containing zinc to which I have applied my invention:—

|  | A | B | C |
|---|---|---|---|
| $SiO_2$ | 71.5 | 75 | 76 |
| $Na_2O$ | 6 | 6.1 | 5 |
| $B_2O_3$ | 8 | 8.8 | 9 |
| ZnO | 12 | 6.6 | 6 |
| CaO |  | 2.2 | 2 |
| FeO | 1.5 | 1 | 1 |
| $Al_2O_3$ | 1 |  | 1 |
| Expansion | .0000044 | .0000045 | .0000044 |
| Heat transmission | 21.2% | 19.1% | 19.8% |
| Visible transmission | 74% | 67% | 74% |

The transmissions as above given are of plates 2 mm. in thickness and light lost by reflection is neglected.

To proper batches for these glasses 1% of carbon in the form of sugar was added as a reducing agent. This is a much greater amount of reducing agent than is necessary or possible in normal heat-absorbing glasses, and the amount of carbon may be increased over the percentage stated, (thus assuring proper reduction of the iron) without harmful effect on color or decrease of heat absorption and visible transmission. All of the above glasses are blue-green in color.

In producing a glass in accordance with this invention, the permissible percentage of the several ingredients is controlled by the following considerations:—

The alkali content is limited in one direction by the fusibility of the glass and in the other direction by the expansion coefficient desired. That is to say, if the alkali is decreased below 5% the glass become difficult to melt while any increase of alkali raises the expansion coefficient.

The boric oxide is limited in that too small an amount of $B_2O_3$ renders the glass difficult to melt unless the alkali is increased while, if the $B_2O_3$ content is raised much above 12% the color loses its bluish character and becomes paler and more yellowish with consequent decrease in heat-absorption and the glass becomes unstable with a tendency to devitrify especially if lime or magnesia is present. Addition of 1% of alumina counteracts the tendency to devitrify to some extent and has no ill effect on the color. On account of the bleaching effect as the $B_2O_3$ content is increased beyond 12% the amount of iron also must be increased to maintain the color and heat-absorption. This causes a corresponding decrease in the visible transmission and tends to lower the efficiency of the glass.

The maximum limit of the content of second group elements is about 12%, that is, either 12% of zinc oxide alone or 12% of combined zinc oxide and other second group oxides. In case another second group element is present with the zinc the amount of the latter should be at least three times that of the former, that is, the ratio between them should be from 3 to 5 parts zinc oxide to 1 part of the other second group element. Good results are obtained by using zinc and lime in the ratio 3 ZnO to 1 CaO, the two totalling 8%. As the total percent of zinc and lime is increased the ratio ZnO to CaO must be increased to avoid devitrification, for example, 6 ZnO−2 CaO; 8 ZnO−2 CaO; 10 ZnO−2 CaO.

The other alkaline earths, magnesia, baryta and strontia, may be substituted in equal percentages for lime in glass B or C with but slight changes in the character of the resultant glass. None of them produce as good a color as lime.

The following are examples of borosilicate glasses containing cadmium to which I have applied my invention:—

|  | M | N | O | P |
|---|---|---|---|---|
| $SiO_2$ | 72.1 | 73 | 75 | 75 |
| $Na_2O$ | 6 | 8 | 6 | 6 |
| $B_2O_3$ | 9 | 8 | 8 | 8 |
| ZnO | 9 |  | 4 |  |
| CdO | 3 | 8 | 4 | 4 |
| CaO |  |  |  | 4 |
| $Al_2O_3$ |  | 1 | 1 | 1 |
| SnO |  | 1 | 1 | 1 |
| FeO | .9 | 1 | 1 | 1 |
| Color | Blue-green. | Blue-green. | Green. | Green. |
| Heat transmission | 24.3% | 12.6% | 19.8% | 15.4% |
| Light transmission | 74% | 67% | 68% | 67% |
| Expansion | .0000044 | .0000048 | .0000042 | .0000045 |

These glasses were melted with the addition of carbon much in excess of that required for the reduction of the iron, and had not cadmium or cadmium and zinc been present would have been dense amber or black.

The rules as to boric acid and alkali content above stated as to zinc borosilicates apply to the cadmium borosilicates. In the latter however the alkaline earth content may be increased and made equal to the cadmium oxide content.

Attention is called to the presence of tin in glasses N, O and P, as I have found that its presence improves in certain respects cadmium glasses not containing zinc, in that it causes more complete reduction of the iron than is otherwise possible in glasses containing iron, carbon and one or more elements of the second periodic group. The results of this action of tin are:

(1) a change from a green or blue-green color to one which is distinctly more blue in character and, (2) a marked increase in heat-absorbing efficiency, it being understood that maximum efficiency depends upon the maximum visible transmission obtainable with a given heat absorption or, vice versa, the maximum heat absorption obtainable with a given visible transmission.

The factors which influence the "tin-effect" are: (a) the choice of the second group element, i. e., zinc or cadmium, (b) the presence of boric oxide and (c) the choice of alkali.

In another application Serial No. 280,389 filed by me on even date herewith, this action of tin is fully explained and is claimed as my invention and hence in this case I only claim such use of tin in a borosilicate glass.

It has been found that, to some extent, lithia can be used in place of soda in these glasses without appreciably changing the color and heat-absorption. However, lithia cannot be used in such a wide range of compositions as can soda on account of the great tendency on the part of lithia glasses to devitrify. Since lithia produces softer glasses than soda, lithia is valuable when it is desired to produce a soft glass of low alkali content. When potash is substituted for soda the colors become yellow green, the heat-absorptions are lowered and the glass is more difficult to melt.

In the following claims a metallic element of the second periodic group having an atomic weight between 60 and 120 includes only zinc and cadmium, or a mixture thereof, and excludes berylium, magnesium, calcium, barium, hydrogen and radium, while "alkaline earth elements" are used to designate only magnesium, calcium, strontium, and barium.

Since addition of carbon affords the cheapest and simplest means of reducing during melting, I have referred to carbon as the reducing agent used throughout the foregoing specification. However, it is to be understood that any carbonaceous material may be used for this purpose and moreover that any substances or means which will produce in the glass a reducing action without undesirable color will accomplish some of the results above specified and fall within the broader limits and scope of my invention.

Having thus described my invention what I claim is:

1. The hereinbefore described method of producing a heat-absorbing borosilicate glass which comprises melting under reducing conditions a batch containing silicon, boron, a metallic element of the second periodic group having an atomic weight between 60 and 120, and iron.

2. The hereinbefore described method of producing a heat absorbing borosilicate glass which comprises melting under reducing conditions a batch containing silicon, boron, a metallic element of the second periodic group having an atomic weight between 60 and 120, an alkaline earth, and iron.

3. The hereinbefore described method of producing a heat absorbing borosilicate glass which comprises melting under reducing conditions a batch containing silicon, boron, a metallic element of the second periodic group having an atomic weight between 60 and 120, an alkaline earth, and iron, the alkaline earth content measured as an oxide being not greater than the content of the element of second group measured as an oxide.

4. The hereinbefore described method of producing a heat absorbing borosilicate glass which comprises melting under reducing conditions a batch containing silicon, boron, tin, cadmium, and iron.

5. The hereinbefore described method of producing a heat absorbing borosilicate glass which comprises melting under reducing conditions a batch containing silicon, boron, tin, cadmium, an alkaline earth, and iron.

6. The hereinbefore described method of producing a heat absorbing borosilicate glass which comprises melting under reducing conditions, a batch containing silicon, boron, tin, cadmium, an alkaline earth, and iron, the alkaline earth content measured as an oxide being not greater than the cadmium content measured as an oxide.

7. The hereinbefore described method of producing a heat absorbing borosilicate glass which comprises melting under reducing conditions a batch containing silicon, boron, a metallic element of the second periodic group having an atomic weight between 60 and 120, tin, and iron.

8. The hereinbefore described method of producing a heat absorbing borosilicate glass which comprises melting under reducing conditions a batch containing silicon, boron, cadmium, tin, and iron.

9. The hereinbefore described method of producing a heat absorbing borosilicate glass which comprises melting under reducing conditions a batch containing silicon, boron, cadmium, an alkaline earth element, tin, and iron.

10. A borosilicate glass containing silica, boric oxide, and an oxide of a metallic element of the second periodic group having an atomic weight between 60 and 120, and rendered heat absorbing by ferrous oxide.

11. A borosilicate glass containing silica, boric oxide, an alkaline earth oxide, and an oxide of a metallic element of the second periodic group having an atomic weight between 60 and 120, and rendered heat absorbing by ferrous oxide.

12. A borosilicate glass containing silica, boric oxide, an alkaline earth oxide, and an oxide of a metallic element of the second periodic group having an atomic weight between 60 and 120, and rendered heat absorbing by ferrous oxide, the amount of the alkaline earth oxide being not greater than the amount of the oxide of the metallic element.

13. A borosilicate glass containing silica, boric oxide, cadmium oxide, tin oxide, and an alkaline earth oxide, and rendered heat absorbing by ferrous oxide, the amount of the alkaline earth oxide being not greater than the amount of the cadmium oxide.

14. A borosilicate glass containing silica, boric oxide, tin oxide and cadmium oxide and rendered heat absorbing by ferrous oxide.

15. A borosilicate glass containing silica, boric oxide, and an oxide of a metallic element of the second periodic group having an atomic weight between 60 and 120, and rendered heat absorbing by ferrous oxide, the boric oxide content being not greater than 12%.

16. A borosilicate glass containing silica, boric oxide, and an oxide of a metallic element of the second periodic group having an atomic weight between 60 and 120, and rendered heat absorbing by ferrous oxide, the boric oxide content being between 5% and 12%.

17. A borosilicate glass containing silica, boric oxide, and cadmium oxide and rendered heat absorbing by ferrous oxide, the boric oxide content being not greater than 12%.

18. A borosilicate glass containing silica, boric oxide, tin oxide and cadmium oxide and rendered heat absorbing by ferrous oxide, the boric oxide content being not greater than 12%.

19. A borosilicate glass containing silica, boric oxide, tin oxide and cadmium oxide and rendered heat absorbing by ferrous oxide, the boric oxide content being between 5% and 12%.

WALTER H. RISING.